(12) United States Patent
Karino

(10) Patent No.: US 8,108,009 B2
(45) Date of Patent: Jan. 31, 2012

(54) IN-VEHICLE HANDS FREE DEVICE

(75) Inventor: Shuji Karino, Kariya (JP)

(73) Assignee: Denso Corporation, Kariya (JP)

( * ) Notice: Subject to any disclaimer, the term of this patent is extended or adjusted under 35 U.S.C. 154(b) by 858 days.

(21) Appl. No.: 11/974,887

(22) Filed: Oct. 16, 2007

(65) Prior Publication Data

US 2008/0096613 A1   Apr. 24, 2008

(30) Foreign Application Priority Data

Oct. 18, 2006 (JP) ................................. 2006-283852

(51) Int. Cl.
H04M 1/00 (2006.01)

(52) U.S. Cl. ............... 455/569.2; 455/569.1; 455/575.9; 455/41.1; 455/41.2

(58) Field of Classification Search ............... 455/575.9, 455/41.2, 41.1, 569.1, 569.2
See application file for complete search history.

(56) References Cited

U.S. PATENT DOCUMENTS

2003/0114202 A1   6/2003 Suh et al.
2003/0224840 A1 * 12/2003 Frank et al. ................ 455/575.9

FOREIGN PATENT DOCUMENTS

| JP | 10-243464 | 9/1998 |
| JP | 2000-270051 | 9/2000 |
| JP | 2003-69664 | 3/2003 |
| JP | 2003069664 | * 3/2003 |
| JP | 2003-218996 | 7/2003 |
| JP | 2003-273801 | 9/2003 |
| JP | 2004218996 | * 5/2004 |
| JP | 2004-222039 | 8/2004 |

OTHER PUBLICATIONS

Office action dated Nov. 4, 2009 in corresponding Japanese Application No. 2006-283852.

* cited by examiner

Primary Examiner — Kamran Afshar
Assistant Examiner — Manpreet Matharu
(74) Attorney, Agent, or Firm — Harness, Dickey & Pierce, PLC

(57) ABSTRACT

An in-vehicle hands free device includes: a voice line coupling element for coupling with an external communication network through a voice line; a communication element for providing a communication link with a cell phone, wherein the communication element receives a reception signal from the network through the cell phone; and a controller for controlling reception of the signal from the cell phone when the communication element receives the signal. The controller determines whether it is possible to control the reception of the signal from the cell phone. The controller prohibits reception signal notice action of the cell phone when the controller determines that it is impossible to control the reception of the signal.

7 Claims, 2 Drawing Sheets

IN-VEHICLE HANDS FREE DEVICE

CROSS REFERENCE TO RELATED APPLICATION

This application is based on Japanese Patent Application No. 2006-283852 filed on Oct. 18, 2006, the disclosure of which is incorporated herein by reference.

FIELD OF THE INVENTION

The present invention relates to an in-vehicle hands free device.

BACKGROUND OF THE INVENTION

Recently, a cell phone for performing a Bluetooth communication method is well known. In accordance with spread of this type cell phone, an in-vehicle hands free device is disclosed in, for example, JP-A-2003-198713 (corresponding to US 2003/0114202) and JP-A-2003-218996. The hands free device communicates with the cell phone by using a Bluetooth communication link.

When the cell phone and the hands free device are coupled with each other by the Bluetooth communication link, the cell phone receives a reception signal from a communication network, and the in-vehicle hands free device receives the reception signal from the cell phone. Then, the in-vehicle hands free device starts to control the cell phone. For example, the hands free device informs a passenger in a vehicle of reception of the reception signal, and the device prohibits output of a ring tone of the cell phone. On the other hand, an in-vehicle navigation device capable of connecting with multiple communication devices is developed, and further, an in-vehicle navigation device having a hands free function is also developed.

An in-vehicle navigation device includes a data communication module and a Bluetooth communication element. The data communication module has a cell phone function for communicating with multiple communication devices. In this navigation device, when the Bluetooth communication element is coupled with a cell phone by using a Bluetooth communication link, a starting trigger for communicating with voice may be generated by the data communication module. In this case, after the Bluetooth communication element cuts the Bluetooth communication link between the element and the cell phone, the data communication module starts to communicate with voice. After the data communication module starts to communicate with voice, the navigation device cannot receive a reception signal from the cell phone even when the cell phone receives the reception signal from the communication network. Accordingly, the navigation device cannot control the cell phone not to output a ring tone of the cell phone.

In this case, the cell phone independently receives the reception signal from the network, and outputs the ring tone even though the data communication module communicates with voice. Thus, the passenger has to operate the cell phone by himself to stop the output of the ring tone. Therefore, it is necessary for the passenger to operate the cell phone additionally.

Accordingly, it is required for the in-vehicle hands free device to improve convenience for the passenger.

SUMMARY OF THE INVENTION

In view of the above-described problem, it is an object of the present disclosure to provide an in-vehicle hands free device.

According to an aspect of the present disclosure, an in-vehicle hands free device includes: a voice line coupling element for coupling with an external communication network through a voice line; a communication element for providing a communication link with a cell phone, wherein the communication element receives a reception signal from the cell phone when the cell phone receives the reception signal from the external communication network; and a controller for controlling reception of the reception signal from the cell phone when the communication element receives the reception signal from the cell phone. The controller determines whether it is possible to control the reception of the reception signal from the cell phone when the communication element receives the reception signal from the cell phone. The controller prohibits reception signal notice action of the cell phone when the controller determines that it is impossible to control the reception of the reception signal from the cell phone.

In this case, it is not necessary to stop the reception signal notice action of the cell phone. Thus, the convenience for a user of the device is improved.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
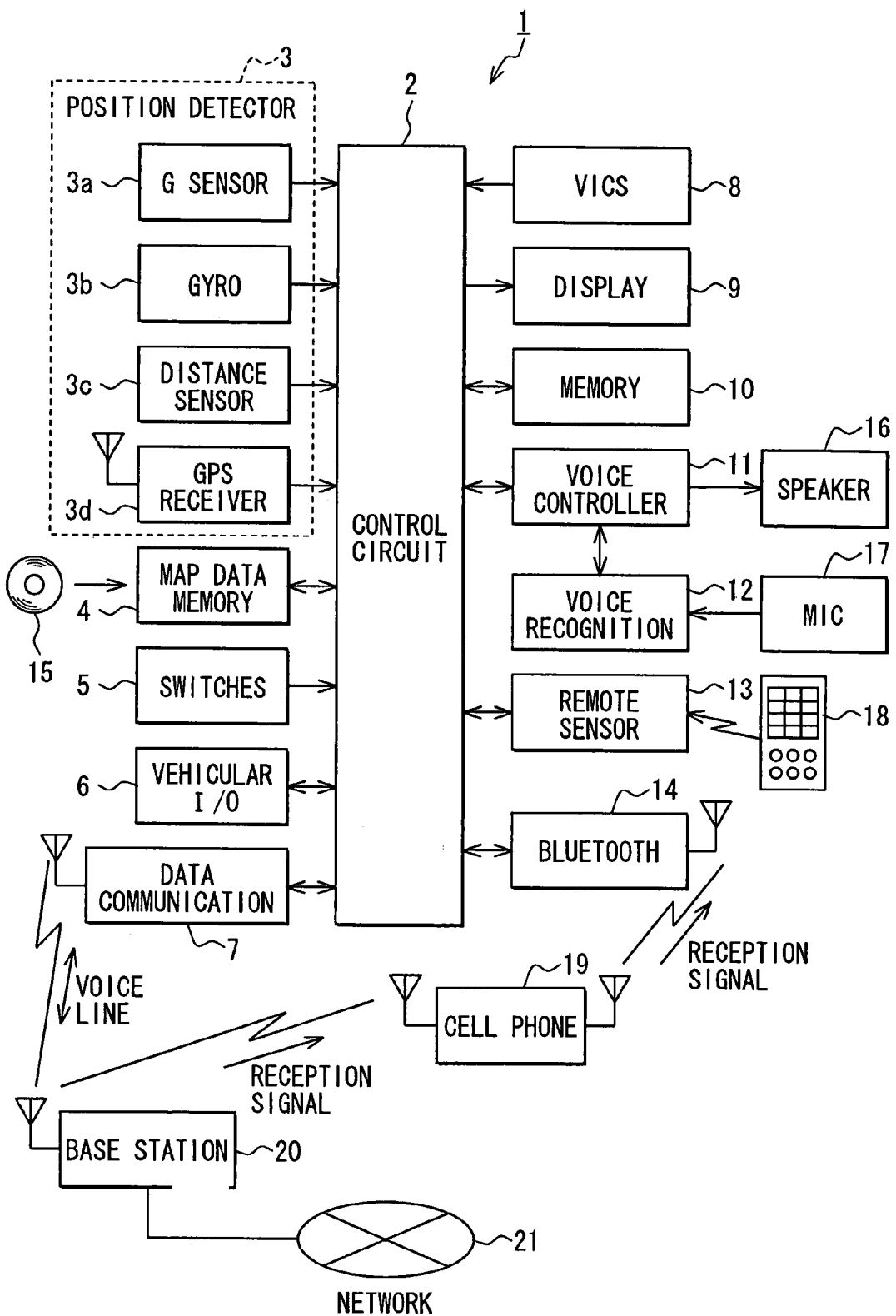
FIG. 1 is a block diagram showing an in-vehicle navigation system.
Figure 2:
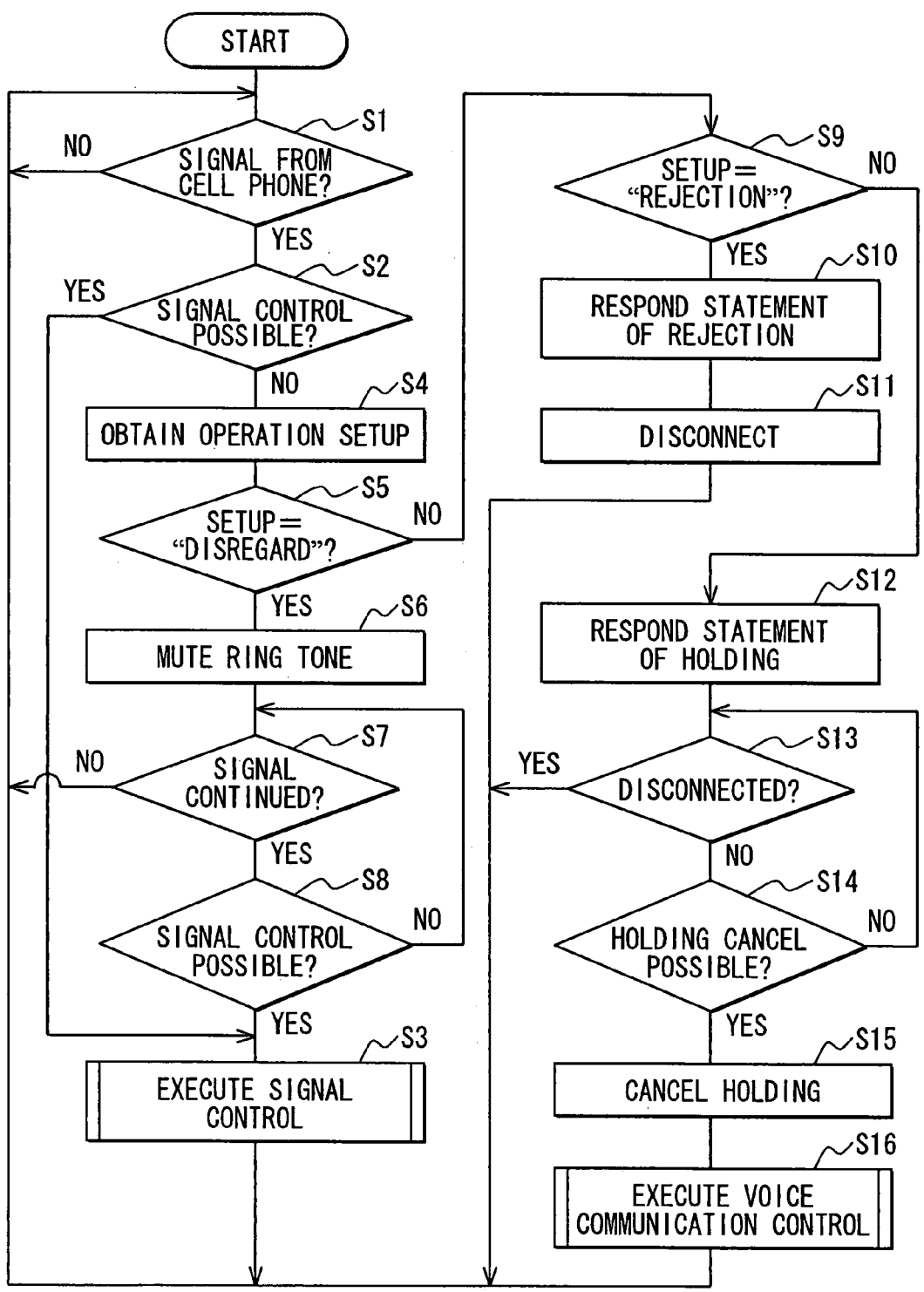
FIG. 2 is a flowchart showing an operation of the navigation system.

An in-vehicle navigation device 1 having a Bluetooth communication function and a hands free function according to an example embodiment of the present disclosure is shown in FIG. 1. The navigation device 1 includes a control circuit 2, a position detector 3, a map data memory 4, multiple operation switches 5, a vehicular signal input/output element 6, a data communication element 7 as a data communication module for coupling with a voice line, a VICS (vehicle information and communication system) receiver 8, a display 9, a memory 10, a voice controller 11, a voice recognition element 12, a remote control sensor 13 and a Bluetooth communication element 14 for communicating with a cell phone 19. Here, the cell phone 19 has the Bluetooth communication function so that the cell phone communicates with the navigation device 1 in order to perform hands free communication.

The control circuit 2 has a CPU, a ROM, a RAM, an I/O interface and a bus for coupling the CPU, the ROM, the RAM and the I/O interface. The control circuit 2 controls whole operation of the navigation device 1. The position detector 3 has a G sensor $3a$, a gyroscope $3b$, a distance sensor $3c$ and a GPS receiver $3d$. Each element in the position detector 3 has independent detection error having different characteristic. In this case, when a detection signal is inputted from each element of the position detector 3 into the control circuit 2, the control circuit 2 compensates mutually the detection signals from the position detector 3, so that a current position of a vehicle, a driving direction of the vehicle, a speed of the vehicle, a driving distance between a certain position and the current position and the like are calculated. Although the position detector 3 includes the G sensor $3a$, the gyroscope $3b$, the distance sensor $3c$ and the GPS receiver $3d$, the position detector 3 may not include all elements as long as the current position of the vehicle can be detected within a required detection accuracy. Alternatively, the position detector 3 may includes a rotation sensor of a steering wheel and/or a traveling wheel sensor for detecting rotation of a tire of the vehicle.

The map data memory 4 memorizes a map data inputted from a record medium 15 such as a DVD-ROM. The record medium 15 may be a HDD or a memory card. The operation switches 5 are formed by a mechanical switch disposed around the display 9 and/or a touch switch displayed on a color liquid-crystal display of the display 9. The vehicular signal input/output element 6 inputs and/or outputs various signals between the device 1 and an ECU or a sensor. The ECU and the sensor are mounted on the vehicle.

The data communication element 7 has a telephone function so that the data communication element 7 is coupled with a communication network 21 such as a public telephone network and a public packet communication network. Specifically, the data communication element 7 and the network 21 are coupled with a data line so that data communication is performed, and further, the data communication element 7 and the network 21 are coupled with a voice line so that voice communication is performed. The VICS receiver 8 receives VICS information from an external system. The display 9 includes, for example, a color liquid-crystal display so that the display 9 displays a screen such as a current position screen and a menu screen. The current position screen shows a map in the map data and a current position icon overlapped on the map. The current position icon represents a current position of the vehicle. The display 9 may include an organic EL display or a plasma display. The memory 10 is formed by a flush memory or the like, which is detachable. The memory 10 memorizes various sorts of information.

The voice controller 11 controls a ring tone and voice to be outputted from the speaker 16. Further, the voice controller 11 controls the voice inputted from the microphone 17. For example, when the control circuit 2 executes route guidance, the voice controller 11 controls the speaker 16 to output voice guidance of the route guidance. When the control circuit 2 executes to control the hands free communication, the control circuit 2 controls the speaker 16 to output the received voice from a conversational person. The voice recognition element 12 analyzes the voice inputted from the microphone 17 as a sending voice based on a predetermined algorithm for recognizing voice. The remote control sensor 13 receives an operation radio wave signal transmitted from the operational remote controller 18, and outputs the signal to the control circuit 2.

When a cell phone 19 handling a Bluetooth communication function is disposed within a communication range, the Bluetooth communication element 14 is coupled with the cell phone 19 by using a Bluetooth communication link. Similar to the data communication element 7, the cell phone 19 is coupled with the communication network 21 by a data line so that data communication between the cell phone 19 and the network 21 is performed. Alternatively, the cell phone 19 is coupled with the communication network 21 by a voice line so that voice communication between the cell phone 19 and the network 21 is performed When the data communication element 7 is connected to the network 21 through a base station 20 by the voice line, the control circuit 2 controls the speaker 16 to output the voice received by the data communication element 7 from the network 21. Further, the control circuit 2 controls the data communication element 7 to transmit the voice inputted from the microphone 17 to the network 21. When the Bluetooth communication element 14 and the cell phone 19 are coupled with the voice line, and further, the cell phone 19 and the network 21 are coupled with another voice line through the base station 19, the voice received by the Bluetooth communication element 14 from the network 21 through the cell phone 19 is outputted from the speaker 16 as a received voice, and further, the voice inputted from the microphone 17 is transmitted from the Bluetooth communication element 14 to the network 21 through the cell phone 19 as a sending voice.

A passenger in the vehicle as a user operates the switches 5 and/or the operational remote controller 18 so that one of three operation modes is selected in case of prohibition of reception control. Here, the three operation modes are a "disregard of reception signal" mode, a "rejection of reception signal" mode, and an "answer holding" mode.

When the Bluetooth communication element 14 and the cell phone 19 are coupled with the Bluetooth communication link, and the data communication element 7 generates a start trigger for voice communication, the control circuit 2 connects between the data communication element 7 and the network 21 with the voice line in order to start the voice communication without cutting off the communication link between the Bluetooth communication element 14 and the cell phone 19.

The control circuit 2 determines whether the Bluetooth communication element 14 receives the reception signal from the cell phone 19 in Step S1. Here, an opponent person sends a telephone number of the cell phone 19 as a sending telephone number, and the cell phone 19 receives the reception signal from the network 21. When the control circuit 2 determines that the Bluetooth communication element 14 receives the reception signal from the cell phone 19 ("YES" in Step S1), the control circuit 2 determines whether it is possible to control, i.e., to limit the reception signal from the cell phone 19 (Step S2).

When the data communication element 7 is not connected to the network 21 through the base station 20 with the voice line, the control circuit 2 determines that it is possible to control the reception signal from the cell phone 19 ("YES" in Step S2). Then, it goes to Step S3 so that the reception signal from the cell phone 19 is controlled, i.e., limited (Step S3). Thus, the navigation device notifies the reception of the reception signal, and further, the control circuit 2 prohibits the cell phone from outputting a ring tone of the reception signal from the cell phone 19.

On the other hand, when the data communication element 7 is connected to the network 21 through the base station 20 with the voice line, the control circuit 2 determines that it is not possible (i.e., impossible) to control the reception signal from the cell phone 19 ("NO" in Step S2). The control circuit 2 obtains an operation setup, which is set at that moment in a case where the reception signal control is impossible (Step S4).

When the control circuit 2 determines that the operation setup at that moment is the "disregard of reception signal" mode ("YES" in Step S5), the ring tone of the reception signal is muted, and the reception signal is disregarded (Step S6). Further, the control circuit 2 prohibits the cell phone 19 from outputting the ring tone of the reception signal. At this moment, the control circuit 2 may prevent the Bluetooth communication element 14 from connecting to the cell phone 19 with the voice line so that the output of the ring tone from the cell phone 19 is banned. Alternatively, although the Bluetooth communication element 14 and the cell phone 19 are connected with the voice line, the Bluetooth communication element 14 may transmit a prohibition signal for output of the ring tone to the cell phone 19 so that the output of the ring tone from the cell phone 19 is banned.

Thus, when the user sets the "disregard of reception signal" mode as an operation setup in case of inability of reception signal control, the ring tone of the reception signal from the network 21 to the cell phone 19 is disregarded. Accordingly, it is not necessary for the user to perform stop operation of the output of the ring tone from the cell phone 19.

Next, the control circuit 2 determines whether the reception signal from the cell phone 19 continues to be received (Step S7), and further, determines whether it is possible to control the reception signal from the cell phone 19 (Step S8). When the control circuit 2 determines that the opponent person stops to signal the cell phone of the user before the voice communication by the data communication element 7 ends, and the reception signal from the cell phone 19 ends before the reception signal control becomes possible (i.e., when the reception signal from the cell phone 19 does not continue to be received), it returns to Step S1 without controlling the reception signal ("NO" in Step S7).

On the other hand, when the control circuit 2 determines that the voice communication by the data communication element 7 ends before the opponent person stops to signal the cell phone of the user, and the reception signal control becomes possible before the reception signal from the cell phone 19 ends (i.e., when the reception signal from the cell phone 19 continues to be received), it goes to Step S3 so that the reception signal is controlled ("YES" in Step S8).

When the control circuit 2 determines that the operation setup at that moment is the "rejection of reception signal" mode ("YES" in Step S9), the Bluetooth communication element 14 and the cell phone 19 are connected with the voice line, and a statement that represents rejection of the reception signal is automatically responded (Step S10). Specifically, the control circuit 2 controls the Bluetooth communication element 14 to transmit a voice massage to the cell phone 19, the voice message being voice guidance such as "I can't take your call right now. Please call me later." Further, the control circuit 2 controls the cell phone 19 to output the voice guidance to the network 21. In this case, the control circuit 2 does not output the voice guidance from the speaker 16.

Thus, the user notifies the guidance for the rejection of the reception signal to the opponent person by setting the "rejection of reception signal" mode as the operation setup in case of inability of reception signal control. The control circuit 2 controls the cell phone to disconnect with the network 21 after the voice guidance is automatically responded (Step S11).

The control circuit 2 may control the Bluetooth communication element 14 to transmit another voice guidance to the cell phone 19, the voice guidance being "I can't take your call right now. Please leave a message." Further, control circuit 2 controls the cell phone 19 to output the voice guidance to the network 21, and the control circuit 2 receives and records voice as a message from the opponent person. Furthermore, the recorded voice from the opponent person may be outputted from the speaker 16 just after the reception signal control becomes possible.

When the control circuit 2 determines that the operation setup at that moment in case of inability of the reception signal control is the "answer holding" mode ("NO" in Step S9), the control circuit 2 controls the Bluetooth communication element 14 to connect to the cell phone 19 with the voice line, and further, a statement that represents answer holding is automatically responded (Step S12). Specifically, the control circuit 2 controls the Bluetooth communication element 14 to transmit a voice massage to the cell phone 19, the voice message being voice guidance such as "I can't take your call right now. Please hold the line for a moment." Further, the control circuit 2 controls the cell phone 19 to output the voice guidance to the network 21. In this case, the control circuit 2 does not output the voice guidance from the speaker 16.

Thus, the user notifies the guidance for answer holding to the opponent person by setting the "answer holding" mode as the operation setup in case of inability of reception signal control.

The control circuit 2 determines whether the opponent person disconnects the line after the voice guidance is automatically responded (Step S13). Further, the control circuit 2 determines whether it is possible to cancel the answer holding (Step S14). Here, for example, the opponent person disconnects the line before the voice communication by the data communication element 7 ends. In this case, the control circuit 2 determines that the opponent person disconnects the line before the answer holding cancellation becomes possible ("YES" in Step S13), so that it returns to Step S1 without controlling the voice communication.

On the other hand, for example, the voice communication by the data communication element 7 ends before the opponent person disconnects the line. In this case, the control circuit 2 determines that the answer holding cancellation becomes possible before the opponent person disconnects the line ("YES" in Step S14), the control circuit 2 cancels the answer holding (Step S15), and further, controls the voice communication (Step S16).

Thus, in the navigation device 1, when the Bluetooth communication element 14 receives the reception signal from the cell phone 19, the control circuit 2 determines whether it is possible to control the reception of the cell phone 19. When the control circuit 2 determines that the reception signal control is impossible, the output of the ring tone of the reception signal from the cell phone 19 is banned. Thus, it is not necessary for the user to stop the output of the ring tone from the cell phone 19. The user needs not to perform extra operation, so that the convenience of the navigation device for the user is improved.

The user can selectively set one of the "disregard of reception signal" mode, the "rejection of reception signal" mode, and the "answer holding" mode as the operation setup in case of inability of reception signal control. When the "disregard of reception signal" mode is selected, the control circuit 2 controls the cell phone 19 to prohibit notification action in accordance with the reception signal. When the "rejection of reception signal" mode is selected, the statement of rejection of the reception signal is automatically responded. When the "answer holding" mode is selected, the statement of answer holding is automatically responded. Thus, by setting the "disregard of reception signal" mode, the user needs not to stop the output of the ring tone from the cell phone 19. By setting the "rejection of reception signal" mode, the statement of rejection of the reception signal is notified to the opponent person. By setting the "answer holding" mode, the statement of answer holding is notified to the opponent person.

Although the navigation device has the hands free function and the Bluetooth communication function, an in-vehicle hands free device having a Bluetooth communication function may provide the above function.

Although the voice guidance for rejection of the reception signal or the voice guidance for answer holding is preliminarily registered, the voice guidance may be prepared by recording voice of the user.

Although the navigation device 1 includes the data communication element 7, the navigation device 1 may include another cell phone or a communication device having telephone communication function, which is connected to the navigation device 1 with a wire.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. An in-vehicle hands free device comprising:
    a voice line coupling element coupling with an external communication network through a voice line, the external communication network being separate from the in-vehicle hands free device;
    a communication element providing a communication link with a cell phone, wherein the communication element receives a reception signal from the cell phone when the cell phone receives the reception signal from the external communication network; and
    a controller controlling reception of the reception signal from the cell phone when the communication element receives the reception signal from the cell phone, wherein
    the controller determines whether it is possible to control the reception of the reception signal from the cell phone when the communication element receives the reception signal from the cell phone;
    the controller prohibits reception signal notice action of the cell phone when the controller determines that it is impossible to control the reception of the reception signal from the cell phone;
    the voice line coupling element is mounted on a vehicle,
    the voice line coupling element is independent from the cell phone, and
    the controller determines that it is impossible to control the reception of the reception signal from the cell phone when the voice line coupling element couples with the external communication network through the voice line.

2. The device according to claim 1, wherein
    the controller is capable of setting one of a reception signal disregard mode, a reception signal rejection mode and a answer holding mode as an operation setup in a case where the controller determines that it is impossible to control the reception of the reception signal from the cell phone, and
    the controller prohibits the reception signal notice action of the cell phone with continuing to couple between the communication element and the cell phone with the communication link when the reception signal disregard mode is set at the time the controller determines that it is impossible to control the reception of the reception signal from the cell phone in a case where the voice line coupling element starts to couple with the external communication network through the voice line under a condition that the communication element and the cell phone are coupled with the communication link.

3. The device according to claim 1, wherein
    the controller controls the reception of the reception signal from the cell phone when the reception of the reception signal from the cell phone continues, and reception control of the reception signal from the cell phone becomes possible after the controller prohibits the reception signal notice action of the cell phone.

4. The device according to claim 2, wherein
    the controller controls the cell phone to automatically respond to the reception signal by sending a statement that reception is rejected when the reception signal rejection mode is set at the time the controller determines that it is impossible to control the reception of the reception signal from the cell phone.

5. The device according to claim 4, wherein
    the controller controls to record a voice from an opponent person after the cell phone automatically responds to the reception signal by sending the statement that reception is rejected.

6. The device according to claim 2, wherein
    the controller controls the cell phone to automatically respond to the reception signal by sending a statement that answer is held when the answer holding mode is set at the time the controller determines that it is impossible to control the reception of the reception signal from the cell phone.

7. The device according to claim 6, wherein
    the controller cancels the answer holding mode and controls voice communication from the cell phone when cancel of the answer holding mode becomes possible after the cell phone automatically responds to the reception signal by sending the statement that the answer is held.

* * * * *